April 16, 1968
J. S. EATON
3,378,171
HEATED ASPHALT ELEVATOR
Filed May 20, 1966
3 Sheets-Sheet 1
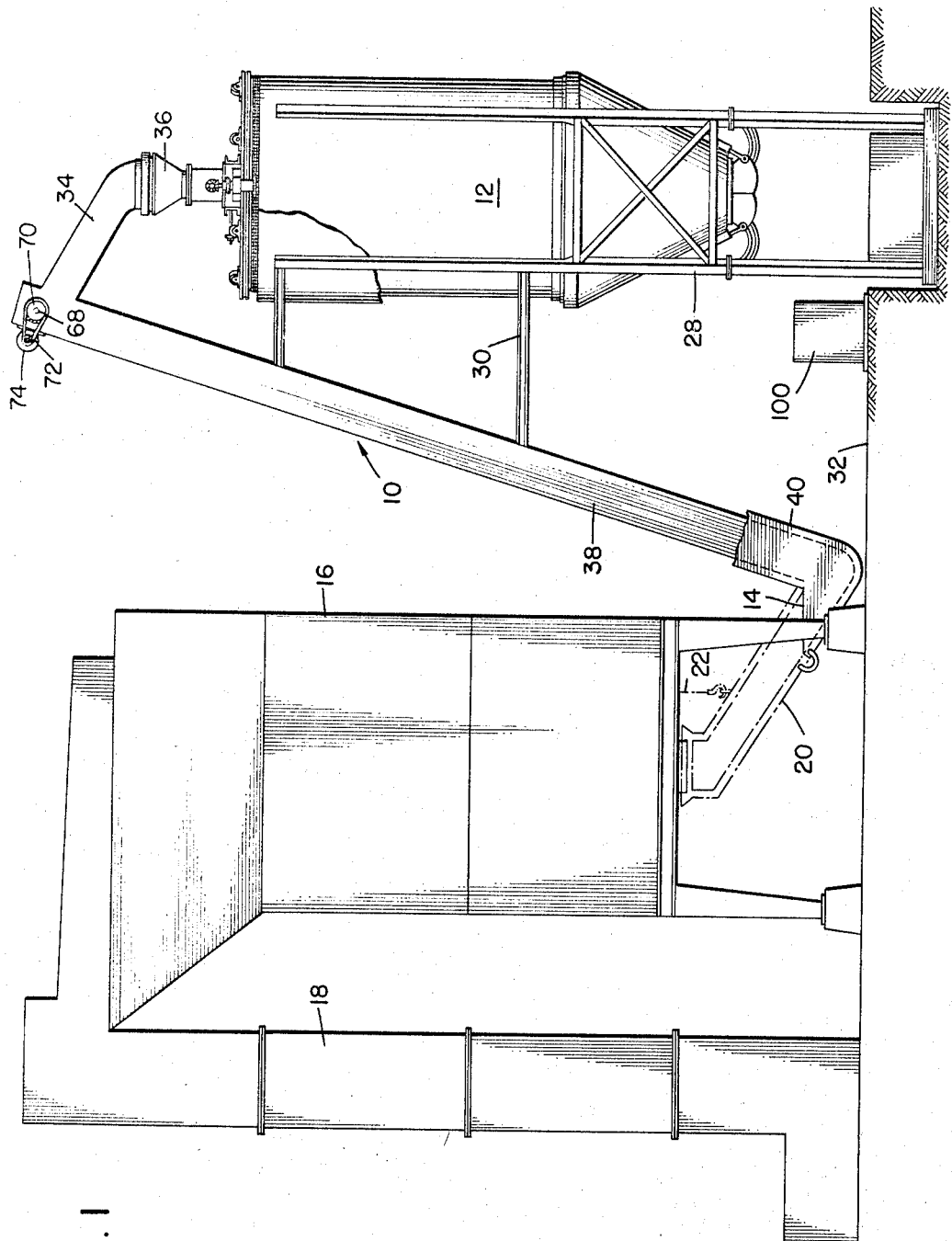
Fig. I
INVENTOR
Jay S. Eaton
BY Gustave Miller
ATTORNEY April 16, 1968     J. S. EATON     3,378,171
HEATED ASPHALT ELEVATOR
Filed May 20, 1966
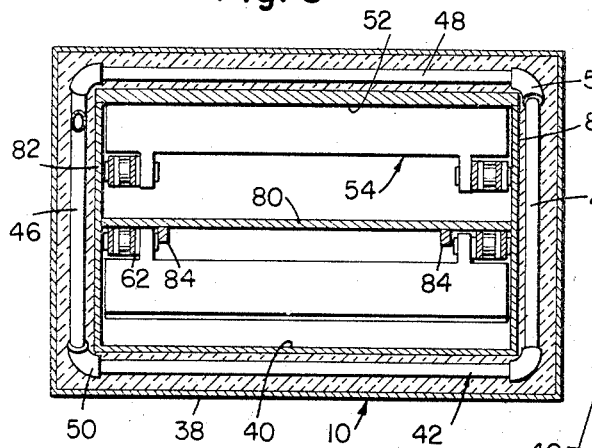
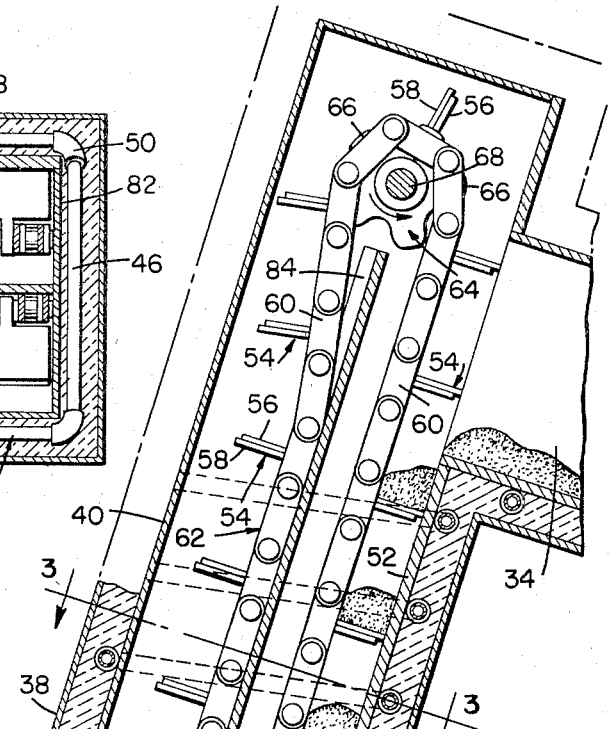
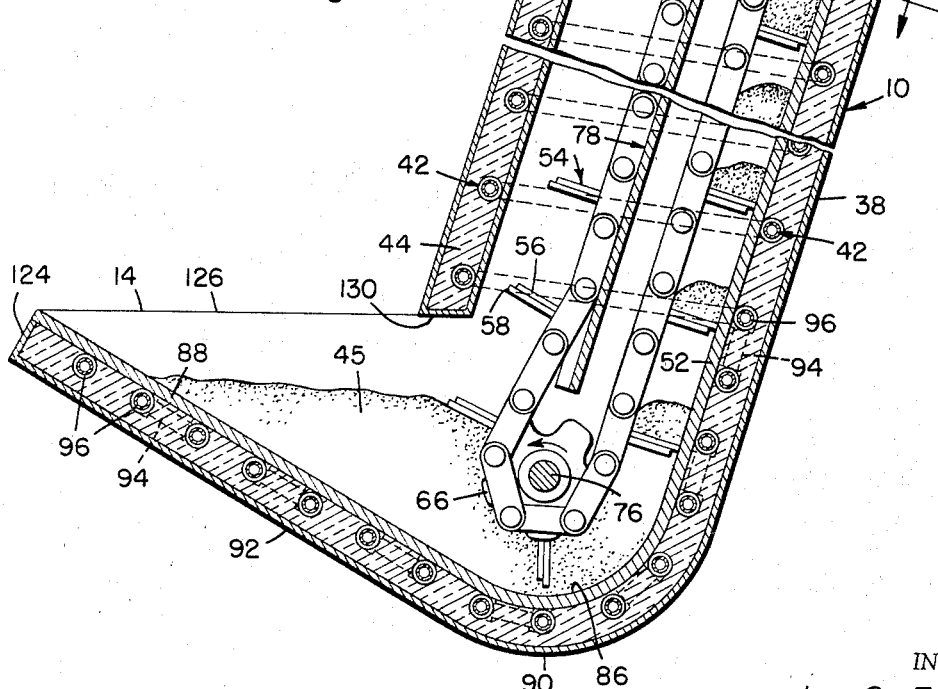
INVENTOR
Jay S. Eaton
BY
ATTORNEY

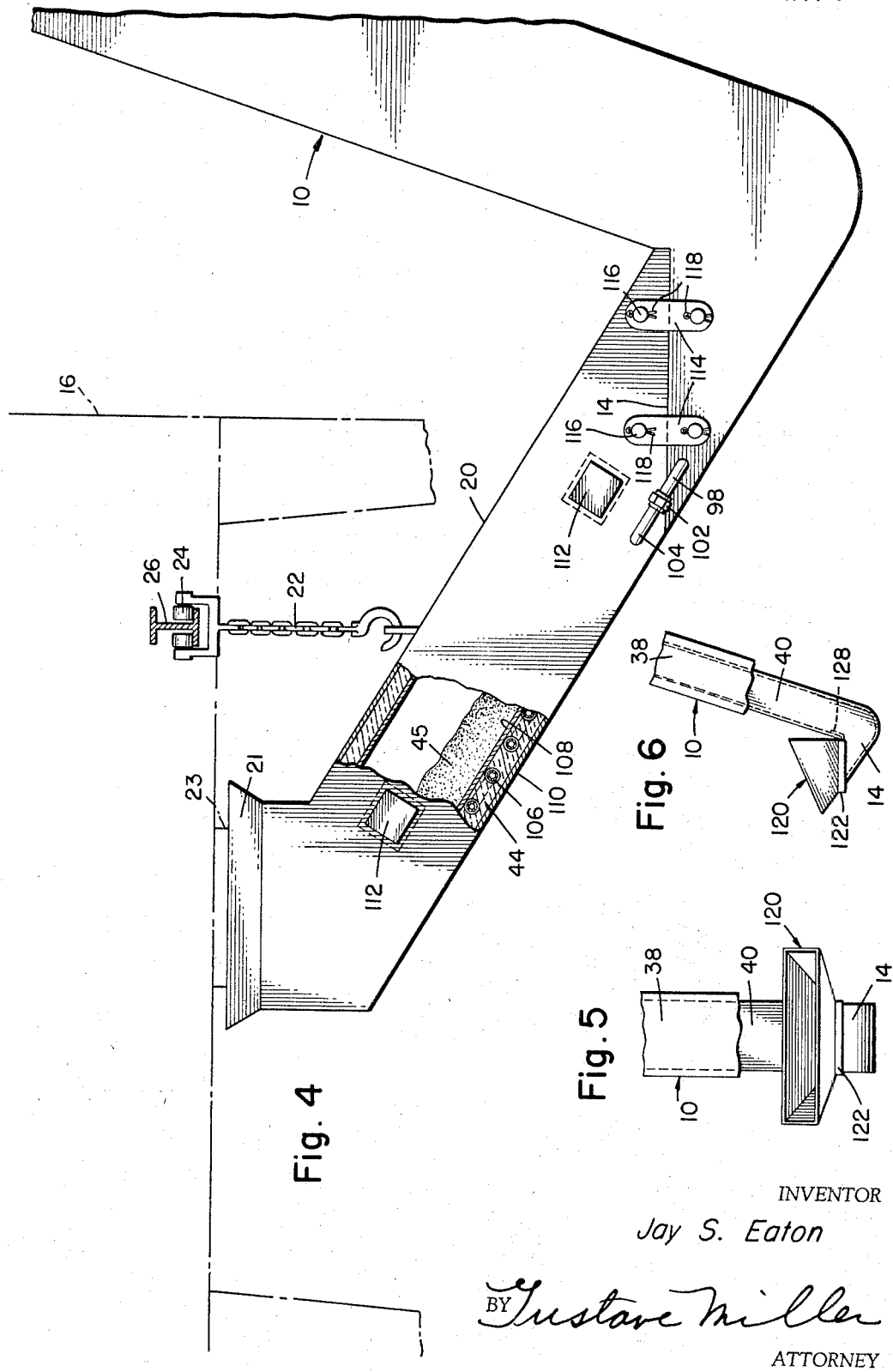

United States Patent Office 3,378,171
Patented Apr. 16, 1968

1

3,378,171
HEATED ASPHALT ELEVATOR
Jay S. Eaton, c/o Dixie Asphalt Co., P.O. Box 6308,
West Palm Beach, Fla. 33405
Filed May 20, 1966, Ser. No. 551,741
15 Claims. (Cl. 222—146)

ABSTRACT OF THE DISCLOSURE

This invention provides an elevator for lifting and discharging heated asphalt mix received from a source, such as an asphalt mix dump truck or an asphalt mixing plant, to the top of a silo unit for storing and maintaining the asphalt in heated condition, ready for discharge into a job delivery truck, and provides an elevator that will occupy much less ground space than the one disclosed in applicant's prior patent.

A further feature is that the elevator is heated, and its basic unit provides a hopper or mouth for receiving the asphalt from a truck, but there is also provided a spout attachment to this hopper so that it may be used in conjunction with an asphalt mixing plant, the spout attachment also having a heating pipe that can be connected to a heating coil in the elevator.

When the elevator is used on a silo unit in the field, a funnel is provided, which may be a permanent part of the elevator hopper when the elevator is intended for field use only, or a separate funnel is provided so that the elevator may be used interchangeably in the field or at the plant, the funnel enabling a dump truck to discharge into the hopper of the elevator.

A further feature is that this elevator is inclined from its base slightly toward the silo unit to which it is to be attached, and the lifting action within the elevator is provided by an endless belt with a plurality of lifts thereon, with the lifts of the ascending flight of the belt carrying hot mixed portions of asphalt mix thereon scraping against the inner wall of the elevator until the portions of asphalt mix fall out through the discharge chute into the top of the silo unit.

The endless belt is in the form of a pair of parallel roller link chains, powered by a gear sprocket at its top and passing over an idler gear sprocket at its bottom, so that power is applied only to the lifting flight thereof. The gear sprockets have an odd number of gear teeth, preferably five, so as to better distribute the wear on the chain, and the individual lifts are mounted on alternate corresponding chain links. The down flight of the belt is supported on a trackway to prevent it from interfering with the ascending flight.

This invention relates to a heated asphalt elevator especially intended for transferring heated asphalt mix from the bottom of an asphalt mixing plant or from a delivery dump truck to the top of a portable heated storage and dispensing plant mix asphalt unit such as shown in applicant's prior, copending patent application Ser. No. 509,964 filed Nov. 26, 1965, now Patent No. 3,304,065 of Feb. 14, 1967.

Background of the invention

Asphalt mix ingredients are hot mixed at a plant, and in order for it to be used, the asphalt mix must be maintained in proper mixed and heated condition for application at the job to a road surface. Expensive heated trucks have been used for delivering the heated asphalt to its place of use, and the greater the distance between the plant and place of use, the more expensive it becomes, particularly in view of the fact that the rate of delivery should not exceed the rate of use. Portable heated mixing plants have been provided, such as shown in patents to Bledsoe, No. 1,136,204 of Apr. 20, 1915; Frazee, No. 1,867,739 of July 19, 1932; Chester, No. 2,413,908 of Jan. 7, 1947; Barber et al., No. 2,705,133 of Mar. 29, 1955; Edgerton, No. 2,746,733 of May 22, 1956 and Wright, No. 3,054,601 of Sept. 18, 1962. In the aforesaid patent, an asphalt mix heated storing silo unit is provided for storing. Applicant's silo unit can be set up close to the location of the job, and delivery thereto is made by large trucks from the mixing plant or from storage silo units at the plant, and then small trucks deliver the asphalt from the silo unit to the job. The silo unit of the aforesaid patent may be set up also as one or more satellite storage units at the asphalt mixing plant, and in this invention, an improved elevator for lifting the heated asphalt mix to the top of the silo units is provided which uses much less ground space, both in the field and at the storage silo unit at the asphalt mixing plant. With this invention, a number of storage units may be located about the asphalt mixing plant, and when needed in the field, one or more of the silo units with this improved elevator may be readily disassembled and temporarily located in the field for as long as needed.

Description of the invention

With the above and related objects in view, this invention consists in the details of construction and combination of parts, as will be more fully understood from the following description, when read in conjunction with the accompanying drawing, in which:

FIG. 1 is an elevational view showing the elevator and its attachment in use between an asphalt mixing plant and a storage silo unit.

FIG. 2 is a vertical sectional view on an enlarged scale, partly broken away, showing the details of the elevator.

FIG. 3 is a cross sectional view on line 3—3 of FIG. 2.

FIG. 4 is a further enlarged, fragmentary partly sectional view showing the hopper attachment for connecting the elevator to an asphalt mixing plant.

FIG. 5 is a front elevational view, on a much smaller scale, of the elevator hopper, partly broken away, showing a dumping truck receiving funnel on the elevator hopper.

FIG. 6 is a side elevation of FIG. 5.

There is shown at 10 the heated asphalt elevator for raising heated asphalt mix 45 and discharging it into the top of a heated asphalt storage silo unit 12, such as disclosed in the aforesaid patent application. At its lower end, the elevator 10 is provided with a mouth or hopper 14, and when a funnel 120 is placed thereon, asphalt mix carrying trucks may discharge asphalt mix into it to be carried up the elevator 10 into the silo 12, particularly when the silo unit 12 has been located in the field, adjacent the job and away from the asphalt mixing plant shown schematically at 16 with its own conventional elevator 18 for delivering the various ingredients making up the mix.

A spout attachment 20 having a mouth 21 is provided for connecting the bottom port 23 of the plant 16 to a delivery truck or to the elevator 10 so that, when the heated asphalt mix has been prepared in the plant 16, it may be transferred to and stored in silo unit 12. Also, though only one silo unit 12 has been illustrated, it will be understood that a number of silos may ring the plant 16, and when one silo unit is filled, the hopper attachment 20 may be disconnected therefrom and carried by its supporting chain 22 on its roller hanger 24 on the track 26 mounted on the plant 16 to a successive silo unit 12, or to a delivery dump truck.

The elevator 10 is rectangular in cross section, as seen in FIG. 3 and is mounted on some of the legs 28 of the silo unit 12 by means of extending arms 30 and suitably attached thereto. The elevator 10 inclines from its bottom toward the top of silo unit 12, the angle of inclination being about 72°, and thus uses up a minimum of space on the ground 32. Thus the mixing plant 16 and a number of satellite silo units may occupy a minimum of space, and when the silo unit 12 is used in the field, it likewise uses only a minimum of space on the ground 32. The inclination of the elevator 10 is rearwardly from its hopper 14 toward a discharge spout 34 extending over the top of the elevator 10, which spout 34 discharges into a receiving hopper 36 on the top of silo unit 12.

The elevator 10 consists of outer metal walls 38 and inner metal walls 40 spaced therefrom about which inner walls 40 there extends a spiral coil of heating pipe 42, insulation 44 being provided in the same space between the walls 38 and 40 and about the pipe 42, except where the pipe 42 is in contact with the inner walls 40 so that the heat may be conducted therethrough to the heated asphalt mix 45 being elevated to keep it hot. The spiral coil of heating pipe 42 may be an electrical heating coil, of the type commonly used in electrical kitchen ranges, sometimes sold under the trade name "Calrod," or may be a hollow pipe through which hot oil is continuously circulated to keep it hot. As shown in FIG. 3, when the pipe is hollow for circulating hot oil or steam, it may be made of a number of short straight pieces 46 and long straight pieces 48 connected by elbows 50, due to the rectangular shape of the elevator 10.

It will be noted that the rear inner wall 52 is of substantial thickness, for as about to be brought out, the asphalt mix 45 is scraped against this thick rear inner wall 52 until it reaches and drops into the discharge spout 34 at the top.

The asphalt mix 45 deposited in the elevator hopper 14 is scraped therefrom by means of lifts 54, here shown as individually being a rigid platform 56 and a slightly flexible lip 58 which scrapes against thick rear inner wall 52. The lifts are secured between corresponding alternate links 60 of each of a pair of roller link chains 62 forming an endless belt powered by an upper pair of gear sprockets 64 having an odd number, preferably five, of sprocket teeth 66.

The sprockets 64 are fixed on a shaft 68 extending through a side wall of the elevator 10 and are powered by a gear 70, gear chain 72 and electric motor 74 of about twenty-five horsepower, mounted on the elevator 10 and connected by a suitable electrical conduit, not shown, to a control accessible to an operator on the ground 32 or wherever convenient. Similar gear sprockets 64 are mounted on an idler shaft 76 for the bottom of the endless belt provided by the roller link chains 62. The shafts 68 and 76 are so located that the ascending flight of lifts 54 scrape against the thick rear inner wall 52, such scraping action, of course, being aided by gravity. The descending flight of lifts 54 slide down along a trackway 78 consisting of a plate 80 mounted between the two short inner walls 82 and stopping a suitable distance short of the rotating gear sprockets 66. Track strips 84 on wall 80 serve to guide the descending flight of lifts 54.

The hopper 14 is provided by continuing the thick inner rear wall 52 through curved portion 86 and an upwardly inclined lip 88, the outer back rear wall 38 continuing in a similar curved portion 90 and spaced upwardly inclined portion 92, ending at edge 124. The front wall stops at end 130 at the hopper 44, but the heating pipe is continued in the rear wall in the form of zigzag portions of pipe consisting of short longitudinals 94 and long transverses 96.

The last section of pipe in the hopper 14 extends through the outside at 98 where it may be connected to a flexible hose, not shown, to the same furnace 100 that is used for keeping the walls of the silo unit hot, when in the field. When used at the mixing plant 16 as shown, the exterior pipe section 98 is connected by a removable pipe union coupling 102 to a pipe section 104 connecting to a similar zigzag pipe portion 106 between the inner bottom wall 108 and outer bottom wall 110 of elevator hopper attachment 20, similar insulation 44 being provided between the walls of attachment 20.

Commercially available electrical vibrators 112, similar to those used in the baffle cone at the bottom of the silo unit 12, as specified in the aforesaid patent, are provided in the attachment 20 for assisting gravity in causing the asphalt 45 to fall down into the hopper 14 and if desired, may also be provided in the discharge spout 34, being powered by convenient electric conduits (not shown).

The hopper attachment 20 is held on hopper 14 by links 114 on studs 116 and secured by pins 118. Obviously, the outer pipe sections 98 and 104 may be semi-flexible hose portions as desired, and hot oil is circulated to and from the furnace 100 by flexible hose sections (not shown).

The hopper attachment 20 may be used for loading a truck directly instead of delivering the hot asphalt mix to the elevator hopper 14, merely by disconnecting from the hopper 14 and swinging it about on its handle track 26.

In FIGS. 5 and 6 there is shown a funnel 120 for use on the hopper 14. The hopper 14 is normally too narrow for a truck to dump hot asphalt mix 45 therein, so a funnel 120 is provided having a width at least as great or slightly greater than the width of the dump truck. If the elevator is intended strictly for field use, the funnel may be permanently built on the hopper 14, but if there is a possibility that the elevator may be used both about the mixing plant 16, as shown and in the field, the funnel 120 will be a separable attachment, provided with a ledge 122 which fits against the front and two side edges 124 and 126 of the elevator hopper 14, and a hooked rear end 128 which extends slightly up the back of the bottom end 130 of the inner front wall 40 of elevator 10. The inner surface of the funnel will, of course, be entirely smooth so as to provide no obstruction to the hot asphalt mix passing therethrough into the hopper 14.

*Operation*

In operation, the silo unit 12 may be set up as one of a number of satellite units about the plant 16, in which case the spout attachment 20 is brought over the hopper 14 on the track 26 and the links 114 are connected. In location on the job, the silo unit 12 is set up with this elevator connected thereto, and heated asphalt mix 45 is fed into the funnel 120 of elevator hopper 14 from a large dump truck, brought from a storage silo unit 12 about the plant 16. The heating coil is connected to the furnace 100 by a flexible hose, or if an electric heater, is connected to a suitable source of electricity. The elevator motor 74 is powered, and controlled to operate the endless belt therewithin as long as any asphalt 45 remains in the hopper 14, until it is all discharged into the silo unit 12 through the spout 34 and the unit hopper 36, being raised by ascending lifts 54 to discharge spout 34.

In the drawings, like numbers refer to like parts, and for the purposes of explication, marshalled below are the numbered parts of the improved heated asphalt elevator:

10—heated asphalt mix elevator
12—silo unit
14—elevator hopper
16—conventional asphalt mixing plant
18—plant elevator
20—spout attachment
21—mouth of 20
22—attachment supporting chain
23—discharge port of 16
24—roller hanger for 22
26—hanger track on 16
28—legs of silo unit 12
30—arms support of 10 on 28
32—ground
34—discharge spout of 10 into 36
36—hopper on 12
38—outer walls of 10
40—inner walls of 10
42—coil of heating pipe
44—insulation about 42 between 38 and 40
45—asphalt mix
46—short pipe pieces
48—long pipe pieces
50—pipe elbows
52—thickened inner rear wall
54—lifts on endless belt
56—rigid platform of 54
58—slightly flexible tip on 56
60—alternate links of 62
62—roller link chains of endless belt conveyor
64—gear sprockets
66—five teeth of 64
68—conveyor power shaft
70—power gear
72—power gear chain
74—electric motor
76—conveyor idler shaft
78—descending conveyor flight trackway
80—trackway plate
82—two short side inner walls of 10
84—track strips
86—curved bottom of 52
88—straight lip extending from 86
90—curved bottom of rear outer wall
92—straight upwardly inclined portion of 90
94—short pipe verticals
96—long pipe transverses
98—outside pipe section of 10
100—silo unit furnace
102—pipe union coupling
104—outside pipe section of 20
106—zigzag pipe in 20
108—inner bottom wall of 20
110—outer bottom wall of 20
112—electric vibrators
114—links 20 to 14
116—studs for 114
118—pins in 116
120—funnel
122—funnel ledge
124—front edge of hopper 14
126—two side edges of 14
128—hooked rear end of funnel 120
130—bottom end of inner front wall 40 of 10

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. In combination, a heated asphalt storing and dispensing silo unit (12) and a heated asphalt elevator (10) supported in fixed relation thereto for feeding heated plant mix asphalt (45) into and through the top of said silo unit (12), said elevator (10) comprising a heated tube (10) supported (30) in fixed relationship to said silo unit, said tube inclining slightly toward the top of said silo unit, an asphalt receiving open hopper (14) provided at the bottom end of said tube (10), an asphalt discharge spout (34) extending from said tube adjacent the top end thereof, and discharging downwardly into and through the top of said silo unit, a conveyor means (62) operatively confined within said inclined tube and heating means (42) surrounding said conveyor means (62).

2. The elevator of claim 1, said heated tube (10) being substantially rectangular in cross section (FIG. 3), said tube (10) comprising an inner heat conductive wall (40), an outer wall (38), said heating means (42) spirally embracing said inner wall, and heat insulating material (44) between said inner and outer walls and about said spiral heating means.

3. The elevator of claim 2, said open hopper (14) extending forwardly and inclining somewhat upwardly from the inner (52) and outer (38) rear walls of said inclined tube (10), the forward inclined wall (38 and 40) of said tube stopping short (130) of said hopper.

4. The elevator of claim 1, said heating means (94, 96) also extending into said hopper.

5. The elevator of claim 1, said heating means extending into said discharge spout.

6. The elevator of claim 1 for feeding heated asphalt mix (45) from an asphalt mix plant (16) to the heated silo unit (12), and a heated downwardly inclined gravity feeding extending spout attachment (20) for said open hopper, said spout attachment having an upwardly extending receiving mouth (21) connectable to a discharge port (23) of an asphalt mix plant (16).

7. The elevator (10) of claim 6, said asphalt heating means (42) in said inclined tube extending (94) into said open hopper (14), asphalt heating means (106) in said spout attachment (20), means (114, 116, 118) for connecting said spout attachment (20) to said open hopper (14) and means (98, 102, 104) for connecting said heating means (94) in said hopper (14) to said heating means (106) in said spout attachment (20).

8. The elevator of claim 1, said conveyor means (62) comprising an endless belt (62), a plurality of asphalt lifts (54) secured on said belt, and means (64, 74) for operating said endless belt to receive asphalt mix (45) at the bottom of said hopper (14) and discharge it into said discharge spout (34) adjacent the top thereof.

9. The elevator of claim 8, said endless belt comprising a chain belt (62), said lift (54) being secured to alternate links (60) of said chain belt.

10. The elevator of claim 8, and a belt descending flight track (78) secured longitudinally between the opposite inner side walls (82) of said tube from adjacent the top to adjacent the bottom thereof, the lifts (54) on the ascending flight of said belt scraping the inner rear wall (52) of said tube and lifting the asphalt thereagainst.

11. The elevator of claim 8, said endless belt comprising a pair of parallel spaced apart roller link chains (62), each said lift (54) being secured between an alternate link (60) of one chain and a corresponding alternate link (60) of the other chain, and a roller chain trackway (78, 80) for the descending belt flight secured longitudinally between the opposite inner side walls (82) of said tube (10) from adjacent the top to adjacent the bottom thereof, the lifts (54) on the ascending flight of said belt scraping a thick inner rear wall (52) of said tube and lifting the asphalt thereagainst, said belt operating means comprising powered operating sprocket gears (64 on 68) at the top of said tube and idler sprocket gears (64 on 76) at the bottom thereof.

12. The elevator of claim 11, said sprocket gears (64) each having an odd number of teeth (66).

13. The elevator of claim 11, said sprocket gears (64) having five gear teeth (66).

14. The elevator of claim 1, and a dump truck receiving funnel (120) on said open hopper.

15. The elevator of claim 3, and a dump truck receiving funnel (120) attachably supported on said hopper (14), said funnel having a smooth inner surface, a ledge (122) on the outer surface of said funnel (120) resting on an edge (124 or 126) of said hopper, and a hooked side (128) on said funnel extending under (130) said short forward wall of said elevator (10).

References Cited

UNITED STATES PATENTS

| | | | |
|---|---|---|---|
| 1,367,719 | 2/1921 | Schutte | 259—159 X |
| 2,028,745 | 1/1936 | Hendrick et al. | 259—157 X |
| 516,995 | 3/1894 | Williams | 222—146 |
| 1,884,423 | 10/1932 | Walker | 259—150 |
| 2,317,313 | 4/1943 | Thoma | 198—155 |
| 2,746,733 | 5/1956 | Edgerton | 259—147 |
| 2,803,380 | 8/1957 | Witte | 222—202 |
| 3,207,365 | 9/1965 | Burford et al. | 222—146 |
| 3,297,159 | 1/1967 | Heise | 259—154 |
| 3,304,065 | 2/1967 | Eaton | 222—196 |

FOREIGN PATENTS

| | | |
|---|---|---|
| 152/26 | 6/1926 | Australia. |
| 1,137,130 | 1/1957 | France. |

STANLEY H. TOLLBERG, *Primary Examiner.*

RAPHAEL M. LUPO, *Examiner.*